May 15, 1923.  
W. B. TERRY  
ANTISKID CHAIN  
Filed May 11, 1921
1,455,178
2 Sheets-Sheet 1
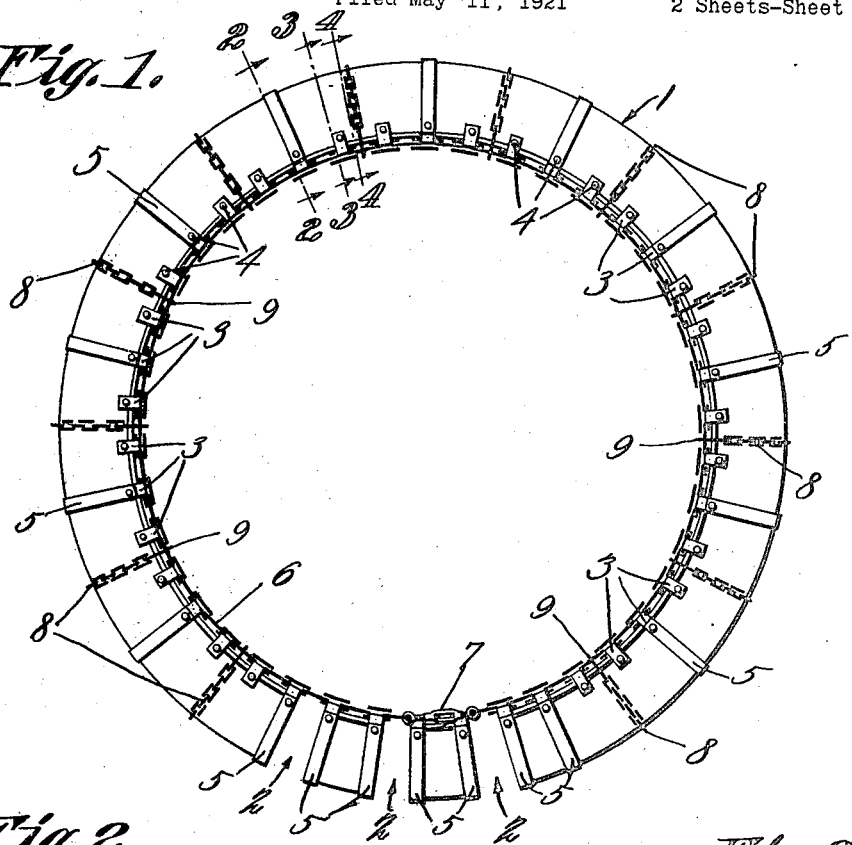
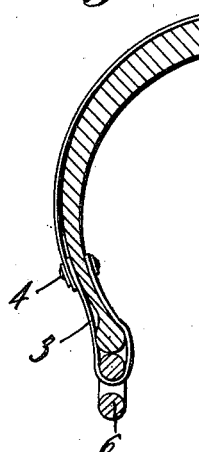
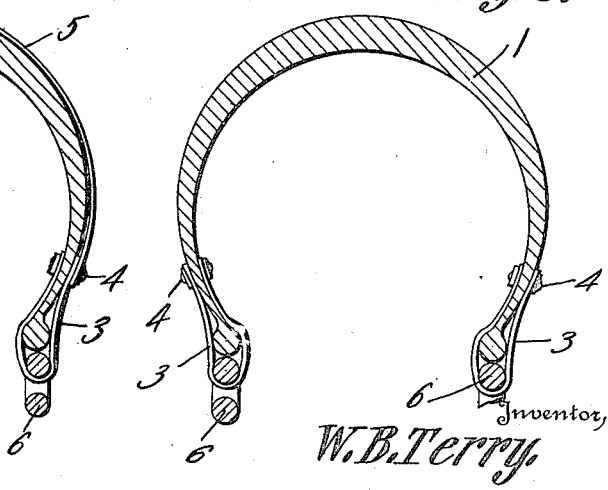
Inventor,  
W. B. Terry,  
By C. A. Snow & Co.  
Attorney

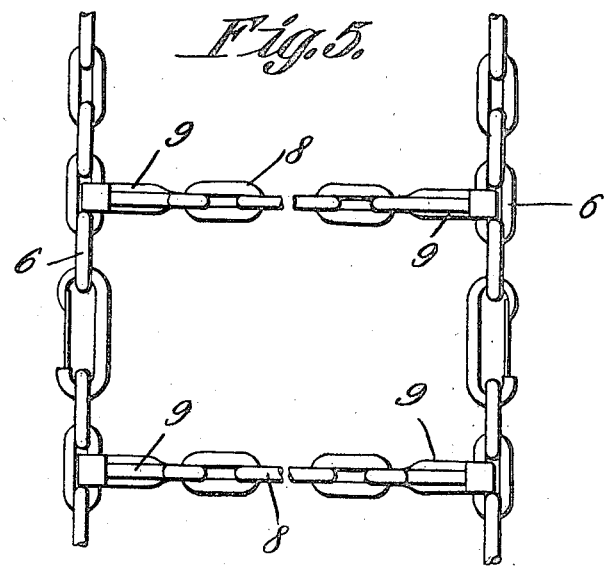
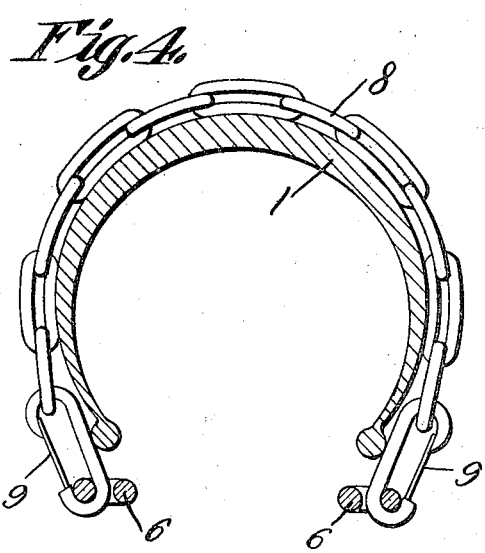
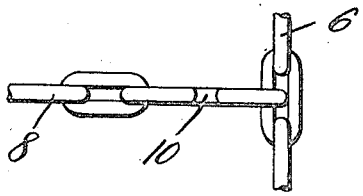
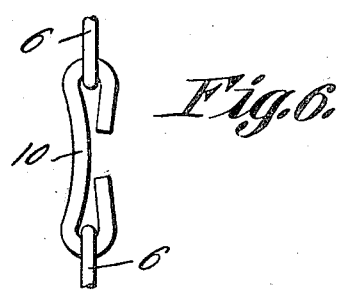

Patented May 15, 1923.

1,455,178

UNITED STATES PATENT OFFICE.

WILLARD B. TERRY, OF SALT LAKE CITY, UTAH.

ANTISKID CHAIN.

Application filed May 11, 1921. Serial No. 468,641.

*To all whom it may concern:*

Be it known that I, WILLARD B. TERRY, a citizen of the United States, residing at Salt Lake City, in the county of Salt Lake and State of Utah, have invented a new and useful Antiskid Chain, of which the following is a specification.

It is the object of this invention to provide a simple means whereby a tire casing may be protected, and skidding prevented, the device being simple in construction and inexpensive to manufacture.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the drawings:—

Figure 1 shows in side elevation, a device constructed in accordance with the invention;

Figures 2, 3 and 4 are sections taken, respectively, on the lines 2—2, 3—3 and 4—4 of Figure 1;

Figure 5 is a plan showing a portion of the chain;

Figure 6 is a plan showing a slight modification; and

Figure 7 is an elevation showing the structure depicted in Figure 6.

The device forming the subject matter of this application includes a body 1, which, preferably, is an old tire casing. The body 1 is cut into any desired number of parts, as shown at 2. According to the present showing, the body is severed into three parts but it may be divided into more or less than three portions. Retainers 3, preferably in the form of metal strips, are extended around the longitudinal edges of the body 1 and are held thereon by securing elements 4. Certain of the securing elements 4 carry the ends of transverse strips 5, ordinarily made of metal and disposed transversely of the body 1, the strips 5 affording reinforcement, and enhancing the tractive capacity of the device.

The retainers 3 are engaged with circumferential elements 6, which may be chains. Any suitable means may be provided for tightening the chains 6, turn buckles 7 being interposed in the chains, if desired.

When an article, constructed as above set forth, is placed about a tire casing, the tire casing, obviously, will be protected, the life thereof will be lengthened, the tractive effort of the vehicle will be increased, and side skidding will be prevented to some extent. Should the highway be unusually slick, or should the vehicle be operating in the mud, it may be necessary to resort to cross chains 8, provided at their ends with snap hooks 9, adapted to be engaged with certain of the links of the side chains 6. The chains 8 may be mounted in place and be removed readily, as occasion may demand.

As shown in Figure 6, a hook link 10 may be used in place of the turn buckle 7 shown in Figure 1. Figure 7 will render it evident that the cross chains 8 may be connected with the side chains 6 by such a part as the hook link 10.

I claim:—

In a device of the class described, a body; retainers extended around the longitudinal edges of the body to form loops; reinforcing strips extended transversely of the body and overlapped on certain of the retainers; securing elements connecting the retainers with the body, certain of the securing elements engaging the reinforcing strips; and circumferential members passing through the retainers.

In testimony that I claim the foregoing as my own, I have hereto affixed my signature in the presence of two witnesses.

WILLARD B. TERRY.

Witnesses:
H. A. SMITH,
H. A. SMITH, Jr.